Nov. 22, 1960

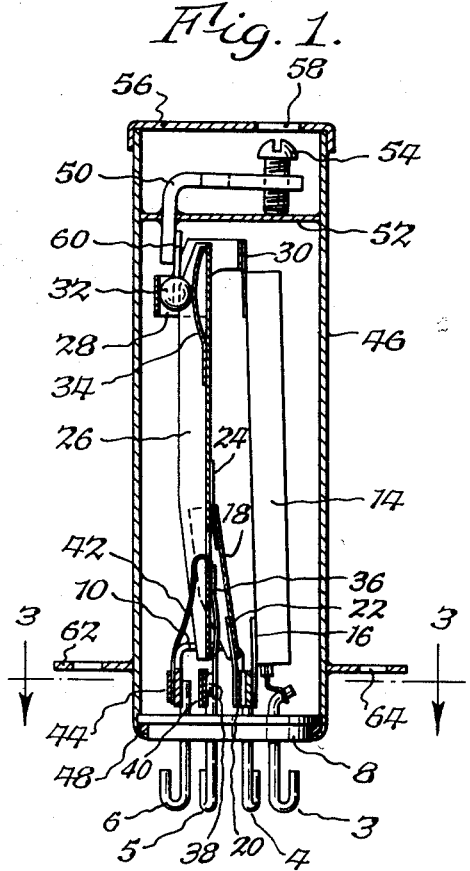

W. C. BROEKHUYSEN 2,961,516

ELECTRO THERMAL RELAY

Filed May 28, 1956

INVENTOR.

William C. Broekhuysen

United States Patent Office 2,961,516
Patented Nov. 22, 1960

2,961,516

ELECTRO THERMAL RELAY

William C. Broekhuysen, Brooklyn, N.Y., assignor to G-V. Controls Inc., East Orange, N.J., a corporation of New Jersey Filed May 28, 1956, Ser. No. 587,531

24 Claims. (Cl. 200—122)

This invention relates to electrical control devices, and more particularly to improvements in electrothermally actuated relays of the type disclosed in my co-pending application S.N. 481,123, filed January 11, 1955.

The requirements of modern electric equipment make it necessary that relays of this type be compact in size, and rugged in construction so that they will be able to withstand under operating conditions all shocks and vibrations to which they may be subjected without breaking down and thereby rendering useless the mechanisms of which they form an important part. Electrothermal relays constructed in accordance with the invention answer all of the requirements of size, compactness, ruggedness and ability to withstand shocks and vibrations, and therefore make it possible to achieve results heretofore not known in the art.

It is an object of the invention to provide an improved electrothermally actuated relay which is simpler in construction than any heretofore known in the art, and which has a high vibration and shock resistance thereby adapting it for use in mechanisms wherein devices of similar types have failed to produce satisfactory results.

It is a further object of the invention to provide a novel electrothermally actuated relay having a high vibration and shock resistance, and one which has a minimum number of parts. The relay is also capable of being quantity produced and will fit into a suitable hermetically sealed, preferably cylindrical, shell.

It is a further object of the invention to provide a novel electrothermally operated relay having a minimum number of operating parts, and one which is capable of withstanding higher shocks of longer duration without damage or false contact action, thereby making it eminently satisfactory for use in mechanisms subjected to most exacting requirements in use.

The invention also consists of a simple, rugged electrothermally operated relay which is free from resonance over a substantially wider range of vibration frequencies than has been possible heretofore, and one which can readily be adjusted so that it can be adapted to meet the most exacting use required of electrical components.

The electrothermally operated relay of the invention is simple in construction and has a minimum number of parts. It lends itself to quantity production and has good compensation over a wide range of ambient temperature, although it is compact and small in size, and capable of being enclosed in a cylindrical shell for hermetic sealing.

The invention is further characterized by the fact that it is provided with control elements suitable for giving short as well as long time delays in its operation.

With these and other objects not specifically mentioned in view, the invention consists in certain combinations and constructions which will be described fully hereinafter, and then set forth in the claims hereunto appended.

In the accompanying drawings which form a part of this specification, and in which the characters of reference indicate the same or like parts:

Figure 1 is a side elevation in cross-section of a preferred form of electrothermal relay embodying the invention provided with an indirectly internally heated control member and a normally closed contact.

Figure 2 is a schematic illustration of the relay shown in Figure 1, but provided with a normally open contact.

Figure 3 is a view taken on line 3—3 in Figure 1.

Figure 4:
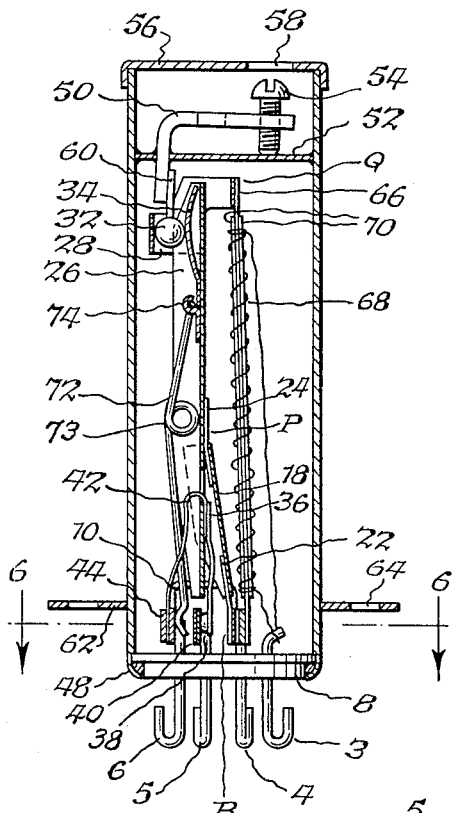
Figure 4 is a cross-sectional side elevation of a modified form of my invention.

Referring to Figure 1 which illustrates a preferred form of the invention, pins 1 to 7 are rigidly mounted in a base 8, but electrically insulated from it by any suitable conventional means, such as glass beads (not shown). A bracket 10 is supported on pins 1, 4, 6 and 7 and is attached to these pins in a suitable manner, as by spot welding. Bracket 10 has an offset portion 12 (Figure 3) between pins 1 and 4. A timing or control member 14 is flexibly supported on offset 12 by a hinge-spring 16 which is attached, as by spotwelding, to both bracket 10 and member 14. Control member 14 may be similar in construction to that disclosed in my Patent 2,700,084, and is provided with an internal heating element 25 (Figure 2) which is electrically connected to pins 2 and 3.

A channel-shaped member 18 is flexibly supported on a cross-bracket 20 by spring 22. Cross-bracket 20 is spotwelded to the inner face of bracket 10 opposite offset 12. The other end of channel 18 is flexibly attached by spring 24 to the center of a generally vertically positioned channel 26 spaced from and substantially parallel to control member 14. A double U-shaped bracket 28 is attached to the top of channel 26. The top of control member 14 is flexibly connected to one side of bracket 28 by spring 30. The other side of bracket 28 surrounds a glass bead 32 which is firmly, yet resiliently clamped against the inside of bracket 28 by a curved flat spring 34 attached to the inside face of channel 26. Members 14 and 18, channel 26, and bracket 28 are all made of the same material such as stainless steel, preferably having a high coefficient of thermal expansion.

The lower end of channel 26 carries a contact spring 36, provided with a contact element 38, preferably formed of silver, which engages a stationary contact bracket 40, preferably silver faced, supported on pin 5. A flexible copper ribbon 42 is attached to channel 26 at substantially the same point as spring 36. The other end of ribbon 42 is clamped to the outer face of bracket 10 by strap 44.

The above described assembly is enclosed in a cylindrical shell 46 which is crimped and soldered to base 8 at 48. Shell 46 is hermetically sealed in a manner similar to that disclosed in my Patent 2,700,084 referred to above. The vertical section of an L-shaped adjusting arm 50 is brazed into diaphragm 52, which in turn is brazed into shell 46 adjacent its top, thereby dividing shell 46 into a large lower section containing the operating parts of the relay, and a small upper section.

The horizontal part of arm 50 extends over diaphragm 52 in the upper section or cavity, and carries at its end an adjusting screw 54 resting on diaphragm 52. A cover 56 on the top of shell 46 is provided with an opening 58 giving access to adjusting screw 54. Bead 32 is fused to a pin 60 rigidly attached to the lower end of arm 50 extending downwardly into the lower section of shell 46. A flange 62 attached to the exterior of shell 46 is provided with two or more mounting holes 64 for mounting the relay on a panel or chassis. Pins 1 to 7, base 8, brackets 10 and 20, shell 46, and diaphragm 52 together form a frame for the operating structure embodying my invention.

In Figure 2, which is a schematic illustration of the relay shown in Figure 1, except that it is provided with normally open contacts, 140 designates the fixed contact bracket mounted on base 8. 138 is a movable contact carried by the lower or free end of channel 26. The junction of member 18 and channel 26 which correspond to the parts shown in Figure 1, is designated P. The junction of member 14 and channel 26 is designated Q and A the junction of base 8 and member 14. B indicates the junction of base 8 and member 18. It will be apparent that ABPQ is an irregular quadrilateral, of which side AQ is the controlling side, sides QP and PB together form the compensating member which is generally V-shaped in cross-section, but can flex at P, and side BA is a part of the base. A lengthening of AQ (due to thermal expansion) will increase the angle BPQ and move contact 138 carried by channel 26 towards the right, as viewed in Figure 2, into engagement with contact 140. As angle BPQ is in the order of 160° to 170°, the horizontal movement of contact 138 will be several times as great as the vertical movement of Q. It will be evident from what has been described above, that when control member 14 in the relay shown in Figure 1 is heated, the elongation thereof will cause a similar movement to the right of contact 38 carried by channel 26. In this case, however, contact 38 will move out of engagement with contact 40.

Referring again to Figure 2, if Q is moved horizontally, as when screw 54 is turned to lift the longer or horizontal part of arm 50, thereby moving bead 32 towards the right, contact 138 will also move towards the right and slightly upwardly. If distance AB is very small as compared with distance AQ, this substantially horizontal movement of contact 138 will be very small. If distance AB is a substantial fraction of distance AQ, the substantially horizontal movement of contact 138 may be larger than the horizontal movement of bead 32. It will be seen, therefore, that there must be a value for AB for which these two movements are substantially equal. Thus in a structure embodying the invention, the vertical movement of Q, resulting from the thermal expansion of control member 14, results in a greatly amplified substantially horizontal movement of contact 138 in the normally open contacts relay of Figure 2, and a similar movement of contact 38 in the normally closed contacts relay shown in Figure 1. However, the horizontal movement of Q resulting from the adjustment of arm 50 results in a substantially equal horizontal movement of contacts 38 and 138. In Figures 1 and 3, the distance AB is the distance between springs 16 and 22, which is determined by the offset in bracket 10.

The operation of the relay shown in Figure 1 is given as follows: When electrical power is applied to pins 2 and 3, an electrical current will flow through heating element 25 which is enclosed within control member 14. The construction of control member 14 and its heating element 25 is essentially the same as that shown and described in my above referred to patent and further showing and description are deemed unnecessary to an understanding of the present invention. The longitudinal thermal expansion of control member 14 causes the lower tip of channel 26 to move towards the right until it engages spring 36 which is biased towards channel 26. Further movement of channel 26 results in the lifting of contact element 38 off contact bracket 40, thereby breaking the electrical connection between pins 5 and 7. The time required to break the circuit depends upon the amount of electrical energy applied to heater 25 in control member 14, the thermal capacity of control member 14, and the distance which the lower tip of channel 26 must travel before it lifts off or disengages contact element 38 from contact bracket 40. As has been explained hereinabove, the initial position of channel 26 can be adjusted as desired by turning screw 54 in one direction or the other. This makes it possible to control the time within wide limits. The electrical energy can be varied by changing the voltage applied to pins 2 and 3. The thermal capacity can be predetermined by the number and size of filler strips enclosed within control member 14, in a manner similar to that described and disclosed in my Patent 2,700,084.

It will be seen that the mass of the relay structure is rigidly supported at both ends against the effects of shock and vibration, and furthermore that the position of the lower end of channel 26 is determined by the length of the four sides of quadrilateral ABPQ, and by the position of bead 32, which are all quite insensitive to shock and vibration. The position of bead 32 in relation to control member 14, member 18, channel 26, and bracket 28 is such that when control member 14 expands longitudinally, due to heating, channel 26 with bracket 28 virtually pivots about bead 32, which reduces friction to a minimum.

Since control member 14, member 18, channel 26 and bracket 28 are all made of the same metal, the shape of quadrilateral ABPQ is not changed by a uniform change in or variation of temperature of these parts. The structure is, therefore, substantially completely compensated for changes in ambient temperature.

Copper ribbon 42 conducts the current directly from pin 7 to one end of spring 36 so that the contact current does not pass through any member which forms a part of quadrilateral ABPQ, and cannot heat any of the parts thereof.

Figure 7:
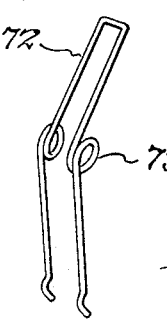
Figure 7 is an isometric view of a spring for maintaining proper tension on the control members shown in Figures 4 and 5.

The electrothermal relay illustrated in Figure 4 is similar to that disclosed in Figures 1 and 2 with the exception that the rigid control member 14 is replaced with a thin flexible ribbon 66, surrounded by a heater winding 68, insulated from each other by two strips of mica or other suitable insulating material 70. For the proper functioning of this structure it is necessary to maintain sufficient tension at all times on ribbon 66 to keep it straight. This is done by means of a torsion spring 72, shown in detail in Figure 7. The upper loop of spring 72 is held under a small hook 74 attached to the inner face of the bottom of channel 26. The lower ends of spring 72 rest against the inside of bracket 10 alongside pins 6 and 7. The two spaced substantially centrally located loops 73 of spring 72 push against the inside or bottom of channel 26 substantially opposite point P. Thus, spring 72 tends to rotate channel 26 counterclockwise, as viewed in Figures 4 and 5, and to increase angle BPQ and maintain tension on ribbon 66.

The operation of the relay shown in Figure 4 is generally the same as that shown in Figure 1 except that due to the much lower thermal capacity of ribbon 66, compared with control member 14, it is especially suitable for much shorter time delays.

Figure 5:
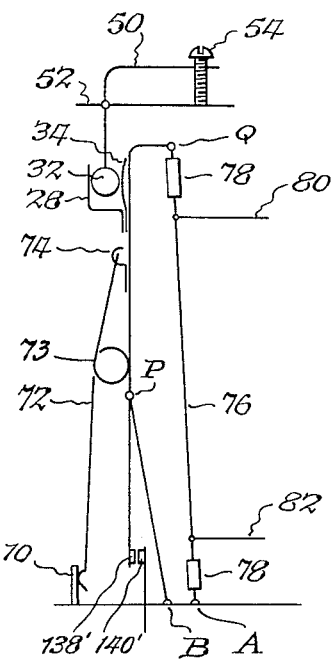
Figure 5 is a schematic illustration of the relay structure shown in Figure 4 but provided with a normally open contact and a hot-wire type of control member.
Figure 6:
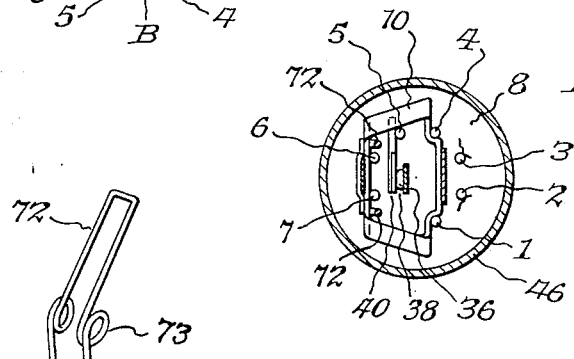
Figure 6 is a view taken on line 6—6 in Figure 4.

In Figure 5, the control member consists of a wire 76 connected by two insulating members 78 to points A and Q. Wire 76 is maintained under tension by a spring 72 in the same manner as disclosed in Figure 4. Wire 76 preferably is made of an alloy having a high specific electrical resistance as well as a high coefficient of thermal expansion. I have found that an alloy consisting of 80% nickel and 20% chromium performs quite satisfactorily. This alloy is known as Nichrome V. Wire 76 may be heated by making suitable electrical connections to its ends as at 80 and 82. In Figure 5, 138' and 140' correspond in construction and function with movable contact 138, and fixed contact 140, respectively, shown in Figure 2. This type of control member is fast in operation, and in fact, faster than the type shown in the structure shown in Figure 4. It is suitable for delay periods ranging from a fraction of a second up to a few seconds.

In all of the structures shown in Figures 1, 2, 4 and 5 side AQ of quadrilateral ABPQ is the controlling member and sides BP and PQ form together the compensating member. The lower part of channel 26 is in effect a rigid extension of side PQ of the compensating member.

What I claim is:

1. An electro-thermal relay comprising a frame, an elongated electrically heated control element supported at one end on said frame, an elongated substantially rigid compensating member, said compensating member and said control element being formed from materials having substantially the same coefficient of thermal expansion, means mounting one end of said compensating member on said frame at a point spaced a predetermined fixed distance from the point of support of said control element, a bracket connecting the free ends of said control element and said compensating member, a fixed contact on said frame, a movable contact carried by said compensating member, means defining a zone of flexure in said compensating member at a point between its ends, whereby when said control element is heated and expands, said compensating member tends to straighten in said zone of flexure and said movable contact is moved gradually relative to said fixed contact, and means engaging said bracket and substantially constantly maintaining the free end of said compensating member located in a predetermined operating position.

2. An electro-thermal relay comprising a frame, an elongated electrically heated control member supported at one end on said frame, an elongated compensating member having one end mounted on said frame at a point spaced a fixed distance from the point of support of said control member, said control member and said compensating member being formed from materials having substantially the same coefficient of thermal expansion, a fixed contact, a movable contact carried by said compensating member, means resiliently connecting the free ends of said control member and said compensating member, a bracket mounted on the free end of said compensating member, an adjusting element engaging said bracket, and means on said free end of said compensating member for substantially constantly biasing said element into engagement with said bracket, whereby when said control member is heated and expands, said compensating member gradually moves said movable contact relative to said fixed contact.

3. An electro-thermal relay comprising a frame, an elongated electrically heated control member having one end mounted on said frame, an elongated generally V-shaped compensating member mounted on said frame and spaced from said control member, said compensating member being provided at the apex of said V with a zone of flexure, a generally U-shaped bracket connecting the free ends of said control member and said compensating member, a fixed contact, a movable contact cooperating with said fixed contact, an actuating arm for said movable contact carried by said compensating member, said arm being supported on said compensating member at a point adjacent said zone of flexure, an adjusting element located in the U of said generally U-shaped bracket, and a spring on said free end of said compensating member operative to bias said adjusting element into substantially constant engagement of said U of said bracket.

4. The relay defined in claim 3 wherein said element comprises a bead, a pin supporting said bead, and a movable adjusting arm for moving said bead laterally relative to the free ends of said compensating member and said control member to control the period of movement of said arm in effecting a movement of said movable contact relative to said fixed contact.

5. An electro-thermal relay comprising a base, a bracket mounted on said base, said bracket having a laterally spaced offset portion, an electrically heatable control member provided with a heater flexibly mounted on said offset portion, an elongated generally V-shaped compensating member, a cross bracket element attached to said offset portion, means flexibly mounting one end of said compensating member on said cross bracket element, said compensating member at the apex of said V having a zone of flexure, a generally U-shaped bracket connecting the free ends of said control member and said compensating member, an adjusting element, means mounting said element to engage within said U of said U-shaped bracket, means on the free end of said compensating member operative to bias said adjusting element to constantly engage said U of said bracket, a fixed contact on said base, a movable contact carried by said compensating member, and said control member being operative when a current is passed through the heater of said control member to elongate said control member, flex said compensating member, and effect a relative movement of said movable contact relative to said fixed contact.

6. The relay defined in claim 3, wherein said electrically heated control member comprises an elongated flexible expansion element, and means for exerting resilient pressure on said compensating member substantially at said zone of flexure for maintaining said flexible expansion element under tension.

7. The relay defined in claim 5, wherein said control member includes a thin flexible heater, a hook formed on said compensating member, a torsion spring having a bail attached to said hook, and means securing the other end of said torsion spring to said first named bracket to maintain said heater under tension at all times.

8. The relay defined in claim 3, wherein said heated control member comprises an elongated flexible heater, a torsion spring having a coiled loop between its ends, and means mounting said torsion spring with one end thereof engaging said compensating member, and the other end secured to said frame, said coiled loop bearing against said compensating member, said spring being operative to maintain said flexible heater under tension at all times.

9. The invention defined in claim 1 wherein said control element includes a flexible ribbon, and a length of resistance wire wound thereabout, and spring means engaging said compensating member for maintaining said control element under tension.

10. The invention defined in claim 5 wherein said control member comprises an elongated non-rigid resistance element and resilient means engaging said compensating member intermediate its ends, operative to maintain said resistance element under tension.

11. An electro-thermal relay comprising a frame, an elongated electrically heated control element comprising a length of resistance wire having one end mounted on said frame, an elongated substantially rigid compensating member, means mounting one end of said compensating member on said frame at a point spaced from the point of support of said control element, a bracket connecting the other ends of said control element and said compensating member, a fixed contact on said frame, a movable contact carried by said compensating member, and a zone of flexure in said compensating member adjacent the point of support of said contact, a torsion spring having a coil between its ends, means mounting one end of said torsion spring on said compensating member with said coil bearing thereagainst, means securing the other end of said torsion spring to said base, and said torsion spring being operative to maintain said wire constantly under tension, said compensating member being operative in response to the heating and elongation of said control member to straighten, whereby said movable contact is moved relative to said fixed contact.

12. An electro-thermal relay comprising a frame, an elongated electrically heated control element comprising a length of resistance wire having one end mounted on said frame, an elongated substantially rigid compensating member, means mounting one end of said compensating member on said frame at a point spaced from the point of support of said control element, a bracket connecting the other ends of said control element and said compensating member, a fixed contact on said frame, a movable contact carried by said compensating member, and a zone of flexure in said compensating member adjacent the point of support of said contact, a torsion spring having a coil between its ends, means mounting one end of said torsion spring on said compensating member with said coil bearing thereagainst, means securing the other end of said torsion spring to said base, and said torsion spring being operative to maintain said wire constantly under tension, said compensating member being operative in response to the heating and elongation of said control member to straighten, whereby said movable contact is moved relative to said fixed contact, and means engaging said bracket and substantially constantly maintaining the free end of said compensating member located in a predetermined operating position.

13. The relay defined in claim 3 wherein said control member comprises a flexible electrical heater, and spring means operatively associated with said compensating member for exerting resilient pressure on said compensating member substantially at the apex of said V for maintaining said heater taut and under tension.

14. An electro-thermal control device comprising a frame, a flexible elongated electrically heatable control element connected at one end to said frame, an elongated generally V-shaped compensating member mounted on said frame, said compensating member at the apex of said V having a zone of flexure, means connecting the free ends of said control element and said compensating member, a fixed contact mounted on said frame, a second contact movable with respect to said first-named contact and cooperable therewith, an actuating arm for said movable contact carried by said compensating member at a point substantially intermediate the length of said compensating member and adjacent said zone of flexure, means linking said connected ends of said element and said member with said frame for preventing movement of said connected ends at right angle to the axes of said element and said member, spring means between said compensating member and said frame tending to straighten said V thereby maintaining said control element under tension, said heatable control element being adapted to expand lengthwise in response to the heating effect of an electrical current, thereby allowing said compensating member to straighten at said zone of flexure under the pressure of said spring means and causing said movable contact to move relative to said fixed contact.

15. An electro-thermal control device comprising a frame, an elongated electrically heatable control element, means flexibly supporting one end of said control element on said frame, an elongated compensating member, means flexibly supporting one end of said compensating member on said frame at a point spaced a short distance from the point of support of said end of said control element, means connecting the free ends of said control element and said compensating member, a contact supported on said frame, a second contact movable with respect to said first-named contact and cooperable therewith, an actuating arm for said movable contact carried by said compensating member at a point substantially intermediate the length thereof, said compensating member being provided with a zone of flexure located between its ends and at a point adjacent the point of mounting of said arm, said short distance between said means flexibly supporting said control element and said means flexibly supporting said compensating member being so related and proportioned to said control element, said compensating member and said actuating arm that a movement of said connected ends of said member and said element at right angle to the axes of said member and said element will cause said movable contact to move relative to said fixed contact, adjustable means linking said connected ends to said frame, said adjustable means including an arm, an insulating body attached to one end of said arm, a rigid surface forming part of said member, said surface being substantially parallel to the axes of said member and said element, resilient means on said member for engaging said insulating body and for maintaining said surface in substantially constant engagement with said body, and adjusting means for moving said arm and said body in a direction substantially at right angles to said surface and said axes.

16. An electro-thermal relay comprising a frame, an elongated electrically heated control element supported at one end on said frame, an elongated generally rigid compensating member, means mounting one end of said compensating member on said frame at a point spaced from the point of support of said control element, means connecting the free ends of said control element and said compensating member, a fixed contact on said frame, a movable contact carried by said compensating member, and a zone of flexure in said compensating member adjacent the point of support of said contact, whereby when said control element is heated and expands, said compensating member tends to straighten and said movable contact is moved relative to said fixed contact, means engaging said connecting means and substantially constantly maintaining the free end of said compensating member located in a predetermined operating position, said connecting means including a generally U-shaped bracket, an adjusting lever mounted on said frame, a bead attached to said lever engaging a part of said U-shaped bracket, and a spring on said free end of said compensating member engaging said bead and urging it into engagement with said bracket.

17. The relay defined in claim 16, including a casing enclosing said heated control element and said compensating member, a diaphragm mounted in said casing above said connected ends of said control element and said compensating member and dividing the interior of said casing into an upper and a lower section, and wherein said adjusting lever is mounted on said diaphragm and has an operating arm extending downwardly therefrom into said lower section, and wherein said bead engaging said generally U-shaped bracket and said spring is carried by said operating arm, said lever also having an arm located in said upper section, and means on said last-named arm for locating said bead and said compensating member and said control element in a predetermined operating position.

18. An electro-thermal relay comprising a frame, an elongated electrically heated control element supported at one end on said frame, a elongated compensating member, said compensating member being of generally rigid construction, said control element and said compensating member being formed from materials having substantially the same coefficient of thermal expansion, means defining a zone of flexure in said compensating member at a point between its ends, means mounting one end of said compensating member on said frame at a point spaced a predetermined fixed distance from the point of support of said control element with the free ends of said control element and said compensating member spaced from each other, means connecting the spaced free ends of said control element and said compensating member, a fixed contact on said frame, a movable contact, means supporting said movable contact carried by said compensating member at a point adjacent said zone of flexure, whereby when said control element is heated by an electrical current and expands, said compensating member bends in said zone of flexure, and said movable contact is moved gradually thereby relative to said fixed contact, and means engaging said connecting means and substantially constantly maintaining the free end of said compensating member located in a predetermined operating position.

19. An electro thermal relay comprising a frame, an elongated electrically heated control element having one end supported on said frame, an elongated compensating member having one end mounted on said frame at a point spaced a fixed distance from the point of support of said control element, and having its free end spaced a fixed distance from the free end of said control element, said control element and said compensating member being constructed from materials having substantially the same coefficient of thermal expansion, a first contact, a second contact operated by said compensating member, means resiliently connecting the spaced free ends of said compensating member and said control element, a bracket mounted on the free end of said compensating member, an adjusting means engaging said bracket, and means on said free end of said compensating member for substantially constantly biasing said adjusting means into engagement with said bracket, whereby when said control element expands in response to being heated, said compensating member effects a relative gradual movement between said first and said second contacts.

20. An electro thermal control device comprising a frame, a flexible elongated electrically heatable control element connected at one end to said frame, an elongated generally V-shaped compensating member mounted on said frame, said control element and said compensating member being made of materials having substantially the same coefficient of thermal expansion, means defining a zone of flexure in said compensating member substantially at the apex of said V, and one end of said compensating member being spaced a predetermined fixed distance from the free end of said control element, means connecting said end of said compensating member and said free end of said control element in spaced apart relationship, a first contact, a second contact movable with respect to said first contact and cooperable therewith, an actuating arm for said second contact operated by said compensating member, means linking said spaced connected ends of said compensating member and said control element with said frame for preventing movement of said connected ends at a right angle to the axes of said member and said element, spring means between said compensating member and said frame tending to straighten said V, and thereby maintaining said control element under tension, said heatable control element being adapted to expand lengthwise in response to the heating effect of an electrical current, thereby allowing said compensating member to straighten in said zone of flexure under the pressure of said spring means and cause said arm to move gradually and effect a relative movement between said first and said second contacts.

21. An electro thermal control device comprising a frame, an elongated electrically heatable control element, means flexibly supporting one end of said control element on said frame, an elongated compensating member having its free end spaced from the free end of said control element, and means flexibly attaching the other end of said compensating member to said frame, said point of attachment being a short distance from the point of support of said fixed end of said control element, means connecting the spaced free ends of said control element and said compensating member, a first contact, a second contact movable with respect to said first contact and cooperable therewith, means mounting said second contact for gradual movement in response to movement of said compensating member, said compensating member having a zone of flexure located between its ends, said short distance between said means flexibly supporting said control element and said means flexibly attaching said compensating member being so related and proportioned to said control element, said compensating member and said second contact that a movement of said spaced connected ends of said control element and said compensating member at right angles to the axes of said element and said member will cause said second contact to be moved relative to said first contact, adjustable means linking said spaced connected ends of said control element and said compensating member to said frame, said adjustable means including an arm, an insulating body attached to one end of said arm, a rigid surface forming a part of said member, said surface being substantially parallel to the axes of said element and said member, resilient means on said member for engaging said insulating body and for maintaining said surface in substantially constant engagement with said body, and adjusting means for moving said arm and said body in a direction substantially at right angles to said surface and said arm.

22. An electro thermal relay comprising a frame, an elongated electrically heated actuating element supported at one end on said frame, an elongated compensating member, said compensating member being of generally rigid construction, and having means defining a zone of flexure in said compensating member at a point between its ends, means mounting one end of said compensating member on said frame at a point spaced from the point of support of said actuating element with the free end of said compensating member spaced from the free end of said actuating element, means connecting the free ends of said actuating element and said compensating member, a first contact, a second contact, means mounting said second contact on said compensating member, whereby when said actuating element is heated by an electrical current and expands, said compensating member bends in said zone of flexure, and said second contact is moved gradually thereby relative to said first contact, and means engaging said connecting means and substantially constantly maintaining the free end of said compensating member in a predetermined operating position.

23. An electro thermal relay comprising a frame, an elongated electrically heated actuating element supported at one end on said frame, an elongated generally rigid compensating member formed from materials having substantially the same coefficient of thermal expansion as said actuating element, means mounting one end of said compensating member on said frame at a point spaced a predetermined fixed distance from the point of support of said actuating element and with the free end of said compensating member spaced from the free end of said actuating element, means connecting the spaced free ends of said compensating member and said actuating element, a first contact, a second contact operable in response to movements of said compensating member, means defining a zone of flexure in said compensating member in a limited section between its ends, whereby when said actuating element is heated and expands, said compensating member tends to straighten and effects the gradual movement of said second contact relative to said first contact, means engaging said connecting means and substantially constantly maintaining the free end of said compensating member located in a predetermined operating position, said connecting means including a generally U-shaped bracket, an adjusting lever mounted on said frame, a bead attached to said lever and engaging a part of said bracket, and a spring on said free end of said compensating member pressing against said bead and maintaining it in engagement with said part of said bracket.

24. An electro thermal control device comprising a frame, an elongated electrically heatable actuating element supported at one end on said frame, an elongated relatively inflexible compensating member having one end supported on said frame coacting with said actuating element and having a limited zone of flexure located between its ends; a bracket connecting the free ends of said actuating element and said compensating member in spaced apart relationship, a first contact carried by said frame, a second contact coacting with said compensating member, means constraining said compensating member to bend in said limited zone of flexure located between its ends, whereby when said actuating element is heated and expands, said compensating member tends to straighten in said zone of flexure, and said compensating member thereby effects a relative gradual movement between said first and said second contacts, and means engaging said bracket and substantially constantly maintaining the free end of said compensating member located in a predetermined operating position.

References Cited in the file of this patent

UNITED STATES PATENTS

| | | |
|---|---|---|
| 1,111,789 | Freas | Sept. 29, 1914 |
| 2,644,483 | Broekhuysen | Dec. 29, 1953 |
| 2,700,084 | Broekhuysen | Jan. 18, 1955 |
| 2,777,969 | Svensson | Jan. 15, 1957 |
| 2,817,731 | De Falco | Dec. 24, 1957 |

FOREIGN PATENTS

| | | |
|---|---|---|
| 21,540 | Great Britain | Sept. 21, 1912 |
| 461,166 | France | Oct. 22, 1913 |